(12) United States Patent
Chakrabarty et al.

(10) Patent No.: US 11,650,318 B2
(45) Date of Patent: May 16, 2023

(54) CHARACTERIZING LINEARITY OF AN OPTICAL FREQUENCY CHIRP OUTPUT BY AN FMCW LASER

(71) Applicant: GM Cruise Holdings LLC, San Francisco, CA (US)

(72) Inventors: Ayan Chakrabarty, Glendora, CA (US); Vladimir Ilchenko, Arcadia, CA (US); Kamel Benboudjema, Pasadena, CA (US); Richard Kalantar Ohanian, Glendale, CA (US); Patrick Nercessian, Burbank, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 477 days.

(21) Appl. No.: 16/840,873

(22) Filed: Apr. 6, 2020

(65) Prior Publication Data

US 2021/0311192 A1 Oct. 7, 2021

(51) Int. Cl.

| G01C 3/08 | (2006.01) |
|---|---|
| G01S 17/34 | (2020.01) |
| G01S 17/931 | (2020.01) |
| G01S 7/4911 | (2020.01) |
| G01S 7/4912 | (2020.01) |

(Continued)

(52) U.S. Cl.
CPC ............ *G01S 17/34* (2020.01); *G01S 7/4814* (2013.01); *G01S 7/4816* (2013.01); *G01S 7/4911* (2013.01); *G01S 7/4912* (2013.01); *G01S 17/931* (2020.01); *G05D 1/0231* (2013.01); *G05D 2201/0213* (2013.01)

(58) Field of Classification Search
CPC ...... G01S 17/34; G01S 17/931; G01S 7/4814; G01S 7/4816; G01S 7/4911; G01S 7/4912; G02D 1/0231; G02D 2201/02313
See application file for complete search history.

(56) References Cited

U.S. PATENT DOCUMENTS

| 4,666,295 A * | 5/1987 | Duvall, III ............. G01S 17/26 372/12 |
|---|---|---|
| 5,289,252 A | 2/1994 | Nourrcier |

(Continued)

FOREIGN PATENT DOCUMENTS

JP 2019045200 A * 3/2019 ............. G01S 17/32

*Primary Examiner* — Mark Hellner
(74) *Attorney, Agent, or Firm* — Calfee, Halter & Griswold LLP (57) ABSTRACT

A system comprises an optical heterodyne device, the optical heterodyne device configured to generate an overlap signal based upon: 1) a first optical signal output by a frequency-modulated continuous-wave (FMCW) laser, wherein the first optical signal comprises an optical frequency chirp that is based upon an input voltage signal received by the FMCW laser; and 2) a second optical signal output by a reference laser. The system also includes a photodetector that is optically coupled to the optical heterodyne device, the photodetector configured to output an electrical beat signal based upon the mixing of the optical signals, wherein the electrical beat signal is representative of the mixed down optical signal. The system further includes a frequency analyzer system that generates, based upon the electrical beat signal, data that is indicative of linearity of the optical frequency chirp in the first optical signal.

20 Claims, 5 Drawing Sheets

(51) Int. Cl.
   *G01S 7/481*     (2006.01)
   *G05D 1/02*      (2020.01)

(56) References Cited

U.S. PATENT DOCUMENTS

| | | | |
|---|---|---|---|
| 5,347,357 A | * | 9/1994 | Nourrcier, Jr. ........ G01S 7/4911 359/239 |
| 5,557,241 A | | 9/1996 | Burke |
| 8,897,654 B1 | | 11/2014 | Pierrottet et al. |
| 8,947,644 B2 | | 2/2015 | Halmos |
| 2006/0109171 A1 | | 5/2006 | Moch |
| 2008/0018526 A1 | | 1/2008 | Wade |
| 2017/0176574 A1 | | 6/2017 | Eswaran et al. |

* cited by examiner

CHARACTERIZING LINEARITY OF AN OPTICAL FREQUENCY CHIRP OUTPUT BY AN FMCW LASER

BACKGROUND

Fully autonomous vehicles (AVs) are currently in development, wherein an AV comprises several sensor systems that output sensor signals, and further wherein the AV includes a computing system that controls operation of the AV based upon the sensor signals output by the sensor systems. The sensor systems of the AV may include a LIDAR system that is configured to generate a three-dimensional point cloud of surroundings of the AV, wherein points in the point cloud represent distances between the LIDAR system and objects in a field of view of the LIDAR system. The LIDAR system includes a laser that emits an optical signal and a detector that detects a return signal, wherein the return signal is based upon the optical signal reflecting from an object. Based upon a parameter of the return signal, a distance between the LIDAR system and the object and the velocity of the object relative to the LIDAR system can be computed. The computing system of the AV can then control operation of the AV based upon the computed range and velocity.

An exemplary type of laser that can be included in a LIDAR system is a frequency-modulated continuous-wave (FMCW) laser. In a LIDAR system that includes an FMCW laser, the FMCW laser emits an optical signal that has been frequency modulated, such that the optical signal is an optical frequency chirp. A part of the FMCW laser signal is emitted to the surroundings of the AV and the other part of the FMCW laser signal (called Local Oscillator) interferes with the return signal (which is based upon the optical signal reflecting off an object) in the LIDAR system to produce a beat signal. The LIDAR system can compute the distance to the object and the velocity of the object relative to the LIDAR system based upon a parameter of the beat signal (e.g., frequencies in the beat signal).

In an AV setting, it is desirable that the LIDAR system compute distances to objects and velocities of the objects relative to the LIDAR system with a relatively high resolution. Critical factors upon which the resolution and signal to noise ratio (SNR) of a FMCW LIDAR system depend include linearity of the optical frequency chirp in the optical signal emitted by the FMCW laser. Put differently, the higher the linearity of frequency alteration with time in the optical frequency chirp, the higher the resolution in distance and velocity measurements that can be achieved by the FMCW LIDAR system. Conventionally, however, there is no suitable approach for characterizing linearity of an optical frequency chirp in an optical signal emitted by an FMCW laser prior to the FMCW laser being incorporated into a LIDAR system.

SUMMARY

The following is a brief summary of subject matter that is described in greater detail herein. This summary is not intended to be limiting as to the scope of the claims.

Described herein are technologies related to characterizing linearity of an optical frequency chirp in an optical signal emitted by a frequency-modulated continuous-wave (FMCW) laser, wherein characterized linearity of the optical frequency chirp can be employed to ascertain whether the FMCW laser is suitable for incorporation into a FMCW LIDAR system that is to be used as a sensor system in an autonomous vehicle (AV).

An exemplary system that is configured to characterize linearity of an optical frequency chirp in the optical signal emitted by an FMCW laser includes a heterodyne device that is configured to heterodyne two optical signals: 1) the first optical signal emitted by the FMCW laser, wherein the first optical signal comprises the optical frequency chirp; and 2) a second optical signal emitted by a narrow linewidth reference laser, wherein a carrier frequency of the first optical signal is similar to a carrier frequency of the second optical signal. The heterodyne device heterodynes the first optical signal and the second optical signal to generate an (optical) overlap signal, where the overlap signal includes the first optical signal and the second optical signal overlaid upon one another.

The system further includes a relatively high-speed photodetector that receives the overlap signal, mixes the first optical signal and the second optical signal in the overlap signal, and outputs an electrical beat signal based upon the overlap signal. In an example, the electrical beat signal can include frequencies in the radio frequency (RF) domain, wherein such frequencies represent differences between frequencies in the first optical signal and the second optical signal over time. The system may optionally include an amplifier that is configured to amplify the electrical beat signal to generate an amplified electrical signal. The system further includes a frequency analyzer system that is configured to output values for frequencies in the amplified electrical signal in the time domain, and the frequency analyzer system can generate, based upon the values for the frequencies, data that is indicative of linearity of the optical frequency chirp included in the first optical signal emitted by the FMCW laser. The data that is indicative of the linearity of the optical frequency chirp can include, for example: I) values that are indicative of frequency modulation errors for frequencies in the optical frequency chirp; and 2) frequency modulation slope error.

More particularly, the frequency analyzer system, with respect to a time varying "beat" signal in the amplified electrical signal, can generate values of "beat" frequencies and thus values for frequencies in the optical frequency chirp) over time, such that the frequency analyzer system can measure each "beat" frequency value in the amplified electrical signal. Based upon the measured frequency values, the frequency analyzer system can compute a linear line (for example, using linear regression) that best fits the measured frequency values, and can further compute "ideal" frequency values on the linear line that temporally correspond to the measured frequency values. For instance; the frequency analyzer system can measure a first frequency value for a first time in a beat of the amplified electrical signal, and the frequency analyzer system can additionally compute a second frequency value for the first time that is on the computed linear line. The frequency analyzer system can compute a difference between the first frequency value and the second frequency value, wherein frequency modulation error for the optical chirp represented by the beat is based upon the computed difference. For instance, the frequency analyzer system can compute an average of differences between measured frequency values and computed frequency values, wherein the frequency modulation error is based upon the average of differences.

In addition, the frequency analyzer system can compute slopes of several linear lines computed for several beats corresponding to several chirps in the FMCW signal, and can additionally compute an average of the computed slopes. The frequency analyzer system can thereafter, for a linear line computed for an optical chirp, determine a difference between a slope of the linear line and the average of the computed slopes. The frequency modulation slope error is based upon the determined difference. When the frequency modulation error and frequency modulation slope error are beneath respective thresholds, the frequency analyzer system can output an indication that the FMCW laser is suitable for use in a LIDAR system that is to be employed in an AV.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to characterizing linearity of an optical frequency chirp in an optical signal emitted by a frequency-modulated continuous wave (FMCW) optical signal are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Technologies relating to characterizing linearity of an optical frequency chirp included in an optical signal emitted by an FMCW laser are described herein. As indicated previously, with respect to a LIDAR system that includes an FMCW laser, resolution of range and velocity values generated by the LIDAR system are dependent upon linearity of alteration of frequencies in optical frequency chirps (introduced by frequency-modulating a carrier optical signal) in optical signals emitted by the FMCW laser. Put differently, the greater the linearity, the higher the resolution for range and velocity measurements generated by the LIDAR system. The technologies described herein enable linearity of optical frequency chirps to be characterized, wherein characterization of linearity of optical frequency chirps emitted by an FMCW laser can be employed to ensure that a LIDAR system that includes the FMCW laser can output range and velocity measurements with desired resolutions.

Figure 1:
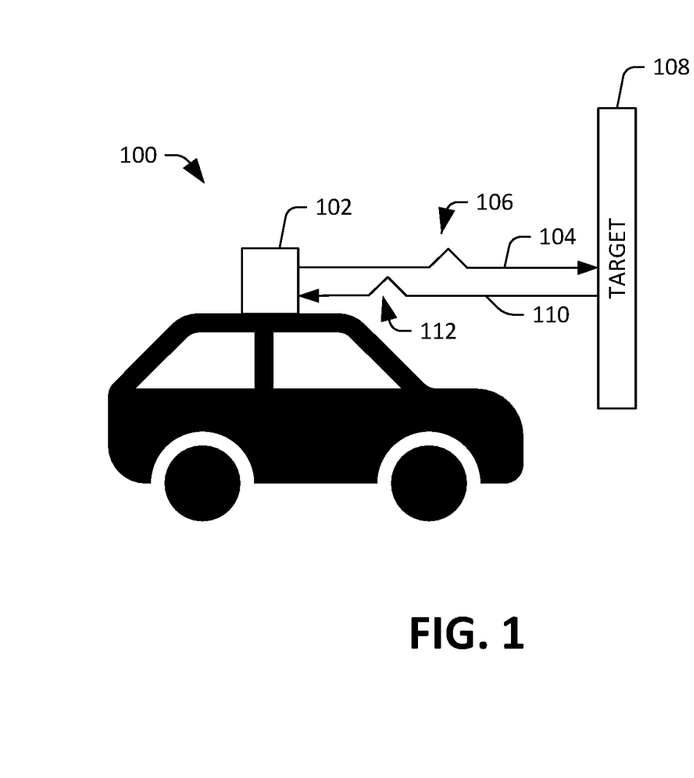
FIG. 1 is a schematic that depicts an autonomous vehicle (AV) that includes a LIDAR system.

Referring now to FIG. 1, an exemplary autonomous vehicle (AV) 100 is depicted, wherein the AV 100 comprises a LIDAR system 102. The LIDAR system 102 can be a spinning LIDAR system or a scanning LIDAR system. Briefly, as referenced above, the LIDAR system 102 includes an FMCW laser that emits an optical signal 104 (depicted in FIG. 1 to illustrate frequencies in the optical signal 104), wherein the optical signal is frequency-modulated to include an optical frequency chirp 106. In the example depicted in FIG. 1, the optical frequency chirp impacts a target 108 (which may be stationary or moving relative to the AV 100), resulting in a return signal 110 that includes a reflected optical frequency chirp 112, wherein the return signal 110 is detected by a detector (not shown) of the LIDAR system 102. The LIDAR system 102 interferes the detected return signal 110 with a local oscillator (LO) (a portion of the optical signal emitted by the FMCW laser), thereby producing a RF beat signal that represents features of the reflected optical frequency chirp 112.

Based upon parameters of the electrical beat signal (e.g., frequencies in the electrical beat signal), the LIDAR system 102 computes a distance to the target 108 and a velocity of the target 104 relative to the LIDAR system 102. The LIDAR system 102 repeats this process for several emitted optical frequency chirps directed to different spatial regions surrounding the AV, such that the LIDAR system 102 can generate a three-dimensional point cloud, wherein a point in the point cloud represents the distance between the LIDAR system 102 and a target (such as the target 108), and further wherein the point can be assigned a value that is indicative of velocity of the target relative to the LIDAR system 102. As will be described below, the AV 100 can include a computing system that receives point clouds output by the LIDAR system 102 (as well as outputs of other sensor systems), wherein the computing system controls operation of the AV 100 based upon the point clouds output by the LIDAR system 102. For example, the computing system can control a propulsion system, a braking system, and/or a steering system based upon point clouds output by the LIDAR system 102.

Figure 2:
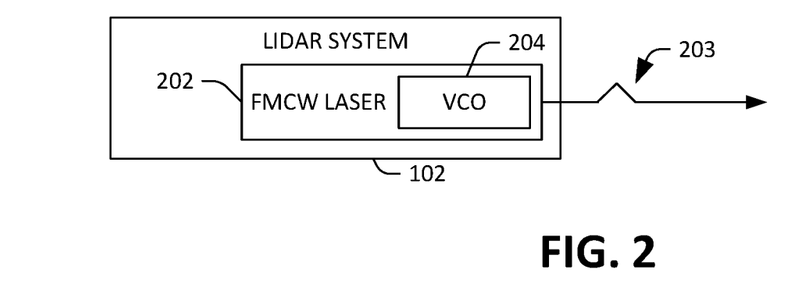
FIG. 2 is a functional block diagram of an exemplary LIDAR system.

Referring now to FIG. 2, a functional block diagram that depicts componentry of the exemplary LIDAR system 102 is illustrated. The LIDAR system 102 includes an FMCW laser 202, which is configured to frequency modulate an optical signal to cause the optical signal to include an optical frequency chirp 203, wherein alterations in frequency in the optical frequency chirp 203 are desirably linear. The FMCW laser 202 can frequency modulate the optical signal at any suitable rate, and the optical frequency chirp 203 can be of any suitable shape. For example, while the optical frequency chirp 203 is illustrated as being triangular, the optical frequency chirp 203 can be trapezoidal, sawtooth, etc. Further, the optical frequency chirp 203 may include different slopes on rise and fall. It is again to be noted, however, that the FMCW laser 202 is to linearly frequency modulate the optical signal to allow for suitable performance of the LIDAR system 102.

The FMCW laser 202 includes a voltage-controlled oscillator (VCO) 204. The VCO 204 is configured to modulate frequency of the optical signal emitted by the FMCW laser 202 based upon voltages received by the VCO 204. Hence, a frequency included in the optical frequency chirp 203 is based upon amplitude of voltage received by the VCO 204 from a voltage source. As discussed previously, the modulated optical signal is emitted into an environment surrounding the AV 100, and the LIDAR system 102 can compute: 1) a distance between the LIDAR system 102 and the target 108; and 2) velocity of the target 104 relative to the LIDAR system 102 based upon a detected return signal.

Figure 3:
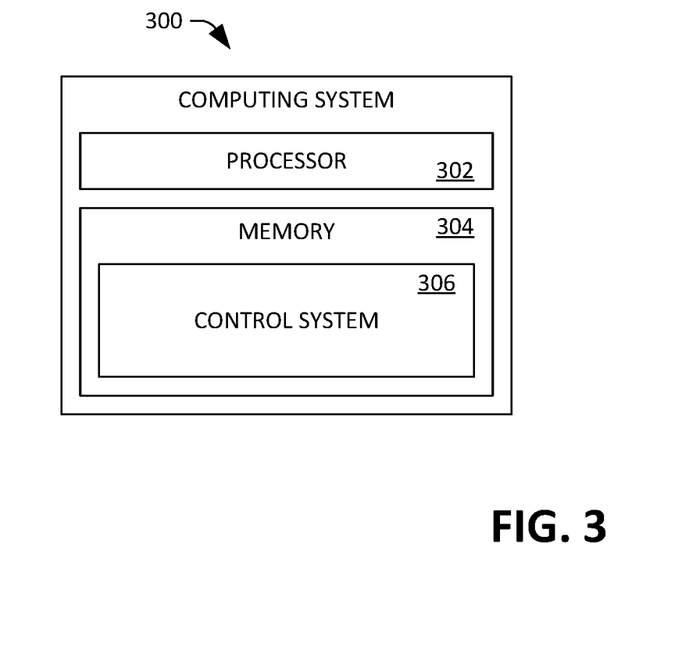
FIG. 3 is a functional block diagram of an exemplary computing system that can be included in the AV illustrated in FIG. 1.

Referring briefly to FIG. 3, a computing system 300 that can be included in the AV 100 is illustrated. The computing system 300 includes a processor 302 and memory 304, wherein the memory 304 has a control system 306 loaded therein. The computing system 300 can receive a point cloud output by the LIDAR system 102, and the control system 306 can control operation of the AV 100 based upon such point cloud. For example, the control system 306 can cause the AV 100 to accelerate or decelerate based upon the point cloud output by the LIDAR system 102, can cause the AV 100 to change direction based upon the point cloud output by the LIDAR system 102, can cause the AV 100 to remain stationary based upon output of the LIDAR system 102, etc. As will be described in greater detail below, linearity of optical frequency chirps emitted by the FMCW laser 202 can be characterized prior to the FMCW laser 202 being incorporated in the LIDAR system 102, and therefore prior to the LIDAR system 102 being incorporated in the AV 100.

Figure 4:
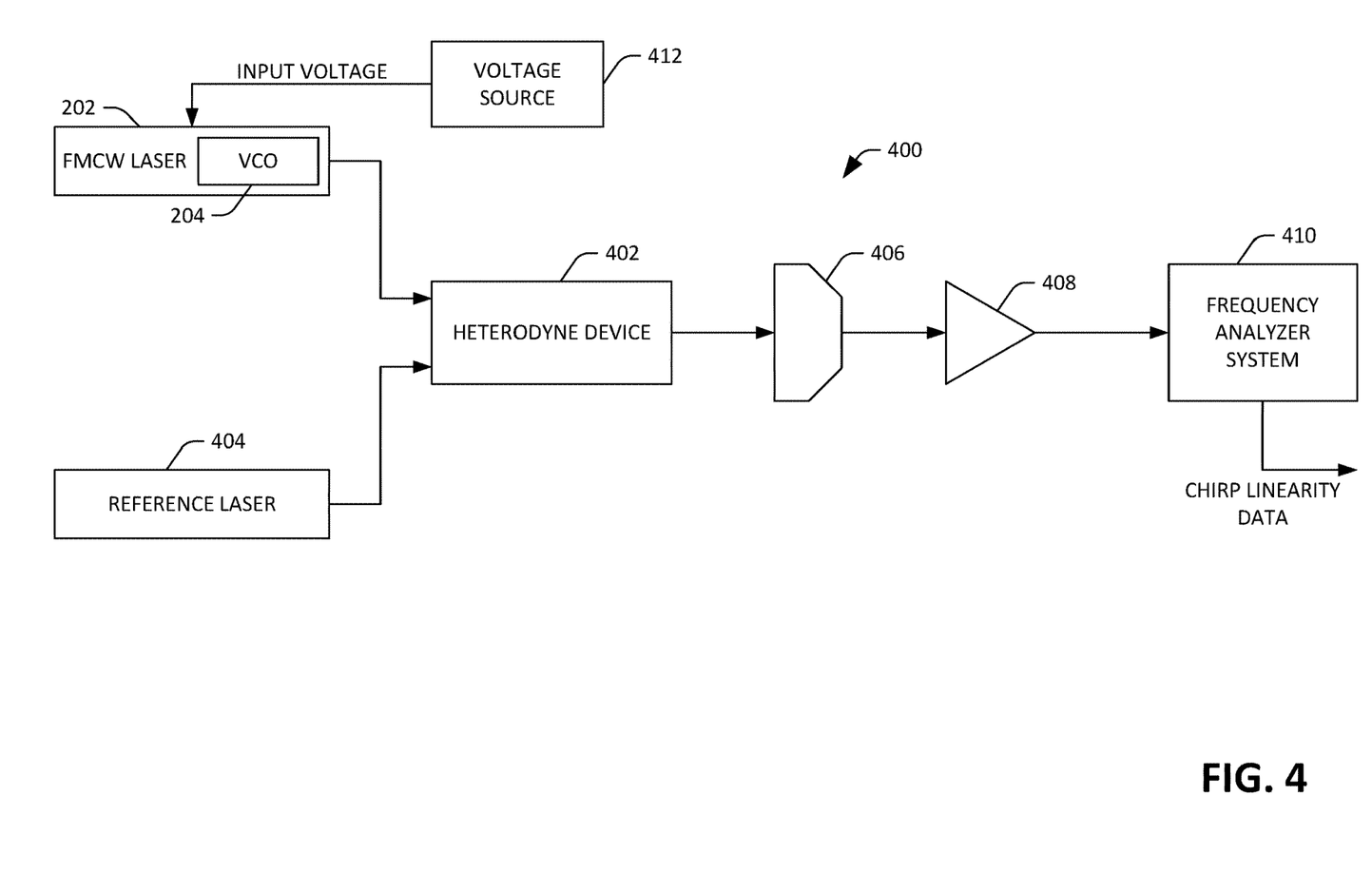
FIG. 4 is a schematic of an exemplary system that is configured to characterize linearity of an optical frequency chirp emitted by a frequency-modulated continuous-wave (FMCW) laser.

Now referring to FIG. 4, a schematic of an exemplary system 400 that is configured to characterize linearity of an optical frequency chirp emitted by the FMCW laser 202 is presented. The system 400 includes a heterodyne device 402 that is optically coupled to the FMCW laser 202 and is further optically coupled to a reference laser 404. In an example, the reference laser 404 can be a tunable narrow linewidth laser. For instance, linewidth of the laser may be on the order of 5 kHz, 10 kHz, 15 kHz, or 20 kHz. While not shown, the heterodyne device 402 may include or have coupled thereto a first optical fiber that is configured to receive a first optical signal emitted by the FMCW laser 202. The heterodyne device 402 may also include or have coupled thereto a second optical fiber that is configured to receive a second optical signal emitted by the reference laser 404. For instance, the first optical fiber can be coupled to a first input port of the heterodyne device 402 and the second optical fiber can be coupled to a second input port of the heterodyne device 402. The first optical signal emitted by the FMCW laser 202 can be directed to the first optical fiber by way of a first free space-to-fiber coupler, while the second optical signal emitted by the reference laser 404 can be directed to the second optical fiber by way of a second free space-to-fiber coupler. In another exemplary embodiment, output of the reference laser 404 can be directly fiber-coupled to the heterodyne device 402.

The system 400 additionally includes a high-speed photodetector 406 that is optically coupled to the heterodyne device 402, such that the photodetector 406 receives (optical) overlap signals emitted by the heterodyne device 402 and converts such overlap signals into electrical signals in the radio frequency (RF) domain. In an exemplary embodiment, the photodetector 406 can be a photodetector with 10 GHz bandwidth. In another example, the photodetector 406 may be a photodetector with 30 GHz bandwidth. Generally, the photodetector 406 is configured to mix optical signals included within overlap signals and generate electrical signals that have frequencies that are equivalent to differences between the frequencies of the optical signal emitted by the FMCW laser 202 and the reference laser 404 over time, wherein the photodetector 406 generates the electrical signals based upon the overlap signals output by the heterodyne device 402. The system 400 additionally includes an amplifier 408 that is electrically coupled to the photodetector 406, wherein the amplifier 408 receives electrical signals output by the photodetector 406 and amplifies such electrical signals.

The system 400 further comprises a frequency analyzer system 410 that is in electrical communication with the amplifier 408, wherein the frequency analyzer system 410 is configured to output data that is indicative of linearity of optical frequency chirps included in optical signals emitted by the FMCW laser 202. The frequency analyzer system 410 can include a high-speed oscilloscope, wherein such oscilloscope can be a digital oscilloscope that generates approximately 10 gigasamples per second with a resolution of approximately 20-30 kHz with a three-nanosecond time resolution.

Operation of the exemplary system 400 is now set forth. The FMCW laser 202 is configured to generate an optical signal having a carrier frequency. A voltage source 412 (such as a function generator or a LIDAR control box) is configured to emit an input voltage that is provided to the FMCW laser 202, wherein the input voltage has amplitudes over time that correspond to desired modulation frequencies. For instance, the input voltage can include a voltage chirp, wherein the voltage chirp has amplitude(s) that are configured to cause the FMCW laser 202 to frequency modulate the optical signal to generate a first optical signal, such that the first optical signal includes optical frequency chirps at a desired chirp rate, having a desired chirp pattern, and with desired chirp slope(s). The VCO 204 of the FMCW laser 202 receives the input voltage and modulates the optical signal to generate the first optical signal, wherein the first optical signal includes an optical frequency chirp. Simultaneously with the FMCW laser 202 emitting the first optical signal, the reference laser 404 emits a second optical signal that, in an exemplary embodiment, has a frequency that is similar to the carrier frequency of the unmodulated optical signal generated by the FMCW laser.

The heterodyne device 402 receives the first optical signal emitted by the FMCW laser 202 and additionally receives the second optical signal emitted by the reference laser 404

(e.g., by way of the aforementioned free space-to-fiber couplers and optical fibers that are connected to input ports of the heterodyne device 402), heterodynes the first optical signal and the second optical signal, and outputs an overlap signal that includes the first optical signal and the second optical signal overlaid upon one another The photodetector 406 receives the overlap signal and generates an electrical beat signal based upon the overlap signal, wherein the electrical beat signal represents differences between frequencies in the first optical signal and frequencies in the second optical signal over time, and is therefore representative of the optical frequency chirp in the first optical signal. With more specificity, the photodetector 406 mixes the first optical signal and the second optical signal in the overlap signal and produces an electrical beat signal in the RF domain (e.g., the electrical beat signal has frequencies between 1/2 GHz and 20 GHz). Thus, the electrical beat signal includes frequencies over time that correspond to frequencies included in the optical frequency chirp over time. The amplifier 408 receives the electrical beat signal and amplifies the electrical beat signal to generate an amplified signal. The frequency, analyzer system 410 receives the amplified signal, and based upon the amplified signal, the frequency analyzer system 410 generates data that is indicative of linearity of the optical frequency chirp included in the first optical signal.

As noted previously, the frequency analyzer system 410 can include a high-speed digital oscilloscope operating at 20 gigasamples per second with a three nanosecond time resolution; hence, the frequency analyzer system 410 can output values that are indicative of frequencies in the optical frequency chirp in the time domain (e.g., frequencies in the optical frequency chirp over time) based upon the amplified signal. Using such values of frequency, the frequency analyzer system 410 can generate data that is indicative of frequency modulation error at different instances in time and can further generate data that is indicative of frequency modulation slope error.

Frequency modulation error and frequency modulation slope error are now described in turn. More particularly, the amplified signal includes time varying beat signal, wherein frequencies in the time varying beat signal represent an optical frequency chirp in the first optical signal. The frequency analyzer system 410, with respect to a beat in the amplified signal, can generate values of frequencies in the beat (and thus values for frequencies in the optical frequency chirp represented by the beat) over time. Thus, the frequency analyzer system 410, for each beat in the amplified signal, can measure several frequency values. Based upon the measured frequency values for the time varying beat signal, the frequency analyzer system 410 can compute a linear line (for example, using linear regression) that best fits the measured frequency values, and can further compute "ideal" frequency values on the linear line that temporally correspond to the measured frequency values. For instance, the frequency analyzer system 410 can measure a first frequency value for a first time in a beat of the amplified electrical signal, and the frequency analyzer system 410 can additionally compute a second frequency value for the first time that is on the computed linear line. The frequency analyzer system can compute a difference between the first frequency value and the second frequency value, wherein frequency modulation error for the optical chirp represented by the beat is based upon the computed difference. For instance, the frequency analyzer system 410 can compute an average of differences between measured frequency values and computed frequency values, wherein the frequency modulation error is based upon the average of differences.

In addition, the frequency analyzer system 410 can compute slopes of several linear lines computed for several beats corresponding to several chirps in the FMCW signal, and can additionally compute an average slope value for the computed slopes. The frequency analyzer system 410 can thereafter, for a linear line computed for an optical chirp, determine a difference between a slope of the linear line and the average of the computed slopes. The frequency modulation slope error is based upon the determined difference.

Frequency modulation error and frequency modulation slope error can then be analyzed to ascertain whether the FMCW laser 202 is suitable for use in the LIDAR system 102 when the LIDAR system 102 is to be employed in an AV. For example, frequency modulation error and/or frequency modulation slope error can be mapped to a range and/or velocity resolution of a LIDAR system.

Figure 5:
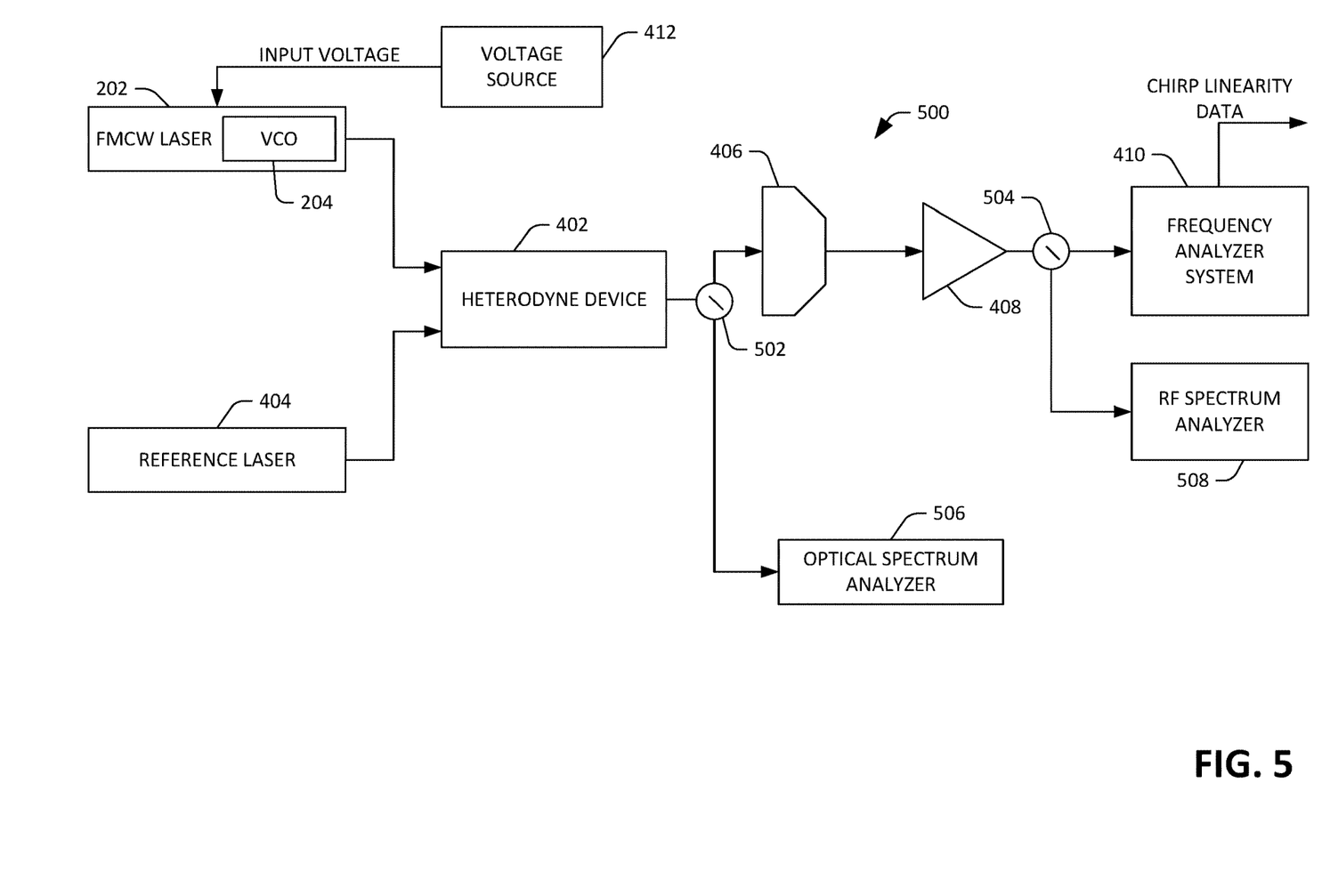
FIG. 5 is a schematic of another exemplary system that is configured to characterize linearity of an optical frequency chirp emitted by an FMCW laser.

Now referring to FIG. 5, a schematic of another exemplary system 500 that is configured to generate values that are indicative of linearity of optical frequency chirps included in an optical signal emitted by the FMCW laser 202 is presented. The system 500 includes the FMCW laser 202, the reference laser 404, the voltage source 412, the heterodyne device 402, the photodetector 406, the amplifier 408, and the frequency analyzer system 410, which operate as described above. The system 500 additionally includes an optical splitter 502 that is configured to split the overlap signal output by the heterodyne device 402. The system 500 also comprises an electrical splitter 504 that is configured to split the amplified electrical signal output by the amplifier 408, While the optical splitter 502 is shown as being separate from the heterodyne device 402, it is to be understood that the heterodyne device 402 may be a 2×2 splitter/coupler, such that the optical splitter 502 may be internal to the heterodyne device 402.

The system 500 additionally includes an optical spectrum analyzer 506 that is coupled to the optical splitter 502. The optical splitter 502 is additionally, coupled to the photodetector 406; hence the overlap signal output by the heterodyne device 402 is directed to the photodetector 406 and the optical spectrum analyzer 506 by way of the optical splitter 502.

The system 500 also comprises a RF spectrum analyzer 508. The RF spectrum analyzer 508 and the frequency analyzer system 410 are electrically coupled to the electrical splitter 504, such that both the frequency analyzer system 410 and the RE spectrum analyzer 508 receive the amplified signal output by the amplifier 408.

Operation of the exemplary system 500 is now set forth. Initially, the voltage source 412 is configured to output zero voltage, such that the first optical signal emitted by the FMCW laser 202 is unmodulated. The reference laser 404 emits the second optical signal simultaneously with the FMCW laser 202 emitting the first (unmodulated) optical signal. The heterodyne device 402 receives the first optical signal emitted by the FMCW laser 202 and the second optical signal emitted by the reference laser 404 and heterodynes such signals to generate an overlap signal. The overlap signal is directed by the optical splitter 502 to the photodetector 406 and the optical spectrum analyzer 506. The optical spectrum analyzer 506 can output data that indicates a difference in frequency between the first optical signal emitted by the FMCW laser 202 and the second optical signal emitted by the reference laser 404. When the optical spectrum analyzer 506 outputs data that indicates that the difference between the frequencies is above a threshold, the reference laser 404 can be tuned to cause the frequency of the second optical signal emitted by the reference laser 404 to be substantially similar to the frequency of the optical signal emitted by the FMCW laser 202 for interference.

Once the frequency of the reference laser 404 has been tuned, the voltage source 412 can direct the input voltage to the FMCW laser 202, wherein the input voltage includes voltage chirps that are configured to cause the VCO 204 to frequency modulate the first optical signal based upon voltage amplitude(s) in the voltage chirps. Accordingly, the first optical signal includes optical frequency chirps. The reference laser 404 continues to emit the second optical signal. The heterodyne device 402 receives the (frequency modulated) first optical signal from the FMCW laser 202 and the second optical signal generated by the reference laser 404, heterodynes the first optical signal and the second optical signal, and outputs an overlap signal based upon the first optical signal and the second optical signal.

The photodetector 406 receives the overlap signal by way of the optical splitter 502 and outputs an electrical beat signal, as described above. The amplifier 408 receives the electrical beat signal and amplifies the electrical beat signal to generate an amplified electrical signal. The RF spectrum analyzer 508 receives the amplified electrical signal by way of the electrical splitter 504. The RF spectrum analyzer 508 allows for the frequencies in the amplified electrical signal to be observed. When frequencies of the amplified signal are outside of the working domain of the photodetector 406 (e.g., when frequencies are outside of the ½ GHz to 20 GHz range), the reference laser 404 can be further tuned to cause such frequencies in the amplified signal to be placed within the working domain of the photodetector 406. Upon the reference laser 404 being further tuned, the frequency analyzer system 410 can generate data that is indicative of linearity of the optical frequency chirp in the first optical signal emitted by the FMCW laser 202 based upon the amplified signal output by the amplifier 408 (e.g., frequency modulation error and frequency modulation slope error, computed as described above with reference to FIG. 4).

Figure 6:
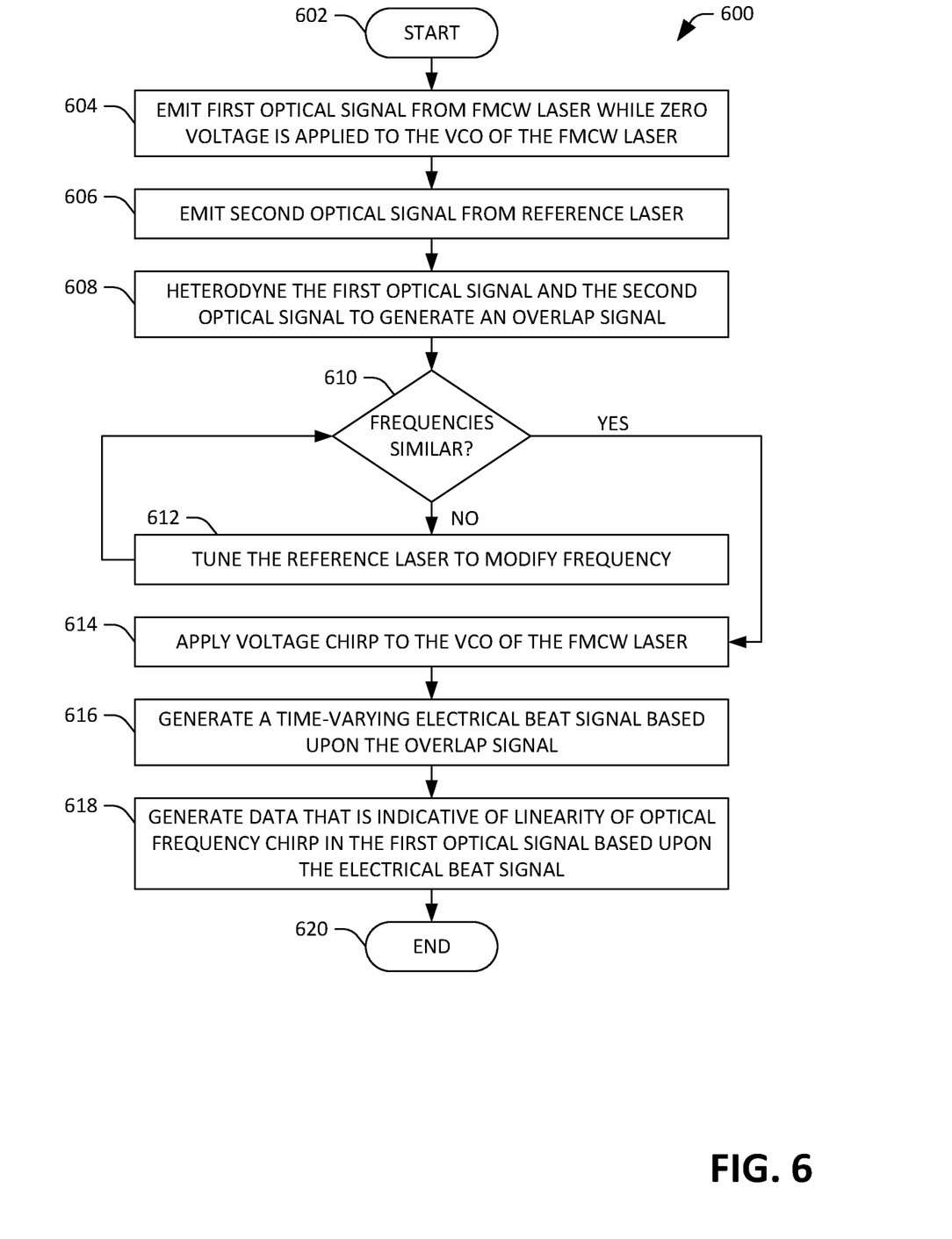
FIG. 6 is a flow diagram illustrating an exemplary methodology for generating data that is indicative of linearity of an optical frequency chirp in an optical signal emitted by an FMCW laser.

Now referring to FIG. 6, a flow diagram illustrating an exemplary, methodology 600 for generating data that is indicative of linearity of an optical frequency chirp in an optical signal output by a FMCW laser is illustrated. The methodology 600 starts at 602, and at 604 a first optical signal is emitted from the FMCW laser while zero voltage is applied to the VCO of the FMCW laser. Thus, at 604 the first optical signal is unmodulated, At 606, a second optical signal is emitted from the reference laser, wherein the second optical signal is likewise unmodulated. Desirably, the first optical signal and the second optical signal have similar frequencies.

At 608, the first optical signal and the second optical signal are heterodyned to generate an overlap signal. At 610, based upon the overlap signal, a determination is made as to whether the first frequency and the second frequency are sufficiently similar to produce interference and to produce the beat signal in the desired frequency range (½ GHz to 20 GHz). For instance, a determination can be made as to whether a difference between the frequency of the first optical signal and the frequency of the second optical signal is beneath a threshold. When the frequencies of the first optical signal and the second optical signal are not sufficiently similar, the methodology 600 proceeds to 612, where the reference laser is tuned to modify the frequency of the second optical signal. The methodology 600 then returns to 610.

When it is determined at 610 that the frequencies of the first optical signal and the second optical signal are sufficiently similar, the methodology 600 proceeds to 614, where a voltage chirp is applied to the VCO of the FMCW laser. The VCO of the FMCW laser modulates the first optical signal based upon the voltage chirp, thereby causing the first optical signal to include an optical frequency chirp.

At 616, a high-speed photodetector generates a time-varying electrical beat signal by mixing optical signals included in the overlap signal. When the VCO applies the voltage chirp, the beat signal frequency changes as a function of time, and therefore the electrical beat signal is representative of the optical frequency chirp in the first optical signal.

At 618 data that is indicative of linearity of the optical frequency chirp in the first optical signal is generated based upon the electrical beat signal output by the photodetector. More specifically, a frequency analyzer measures change in frequency as a function of time, and linearity of the optical frequency chirp is measured based upon the measured change in frequency. The methodology 600 completes at 620.

Figure 7:
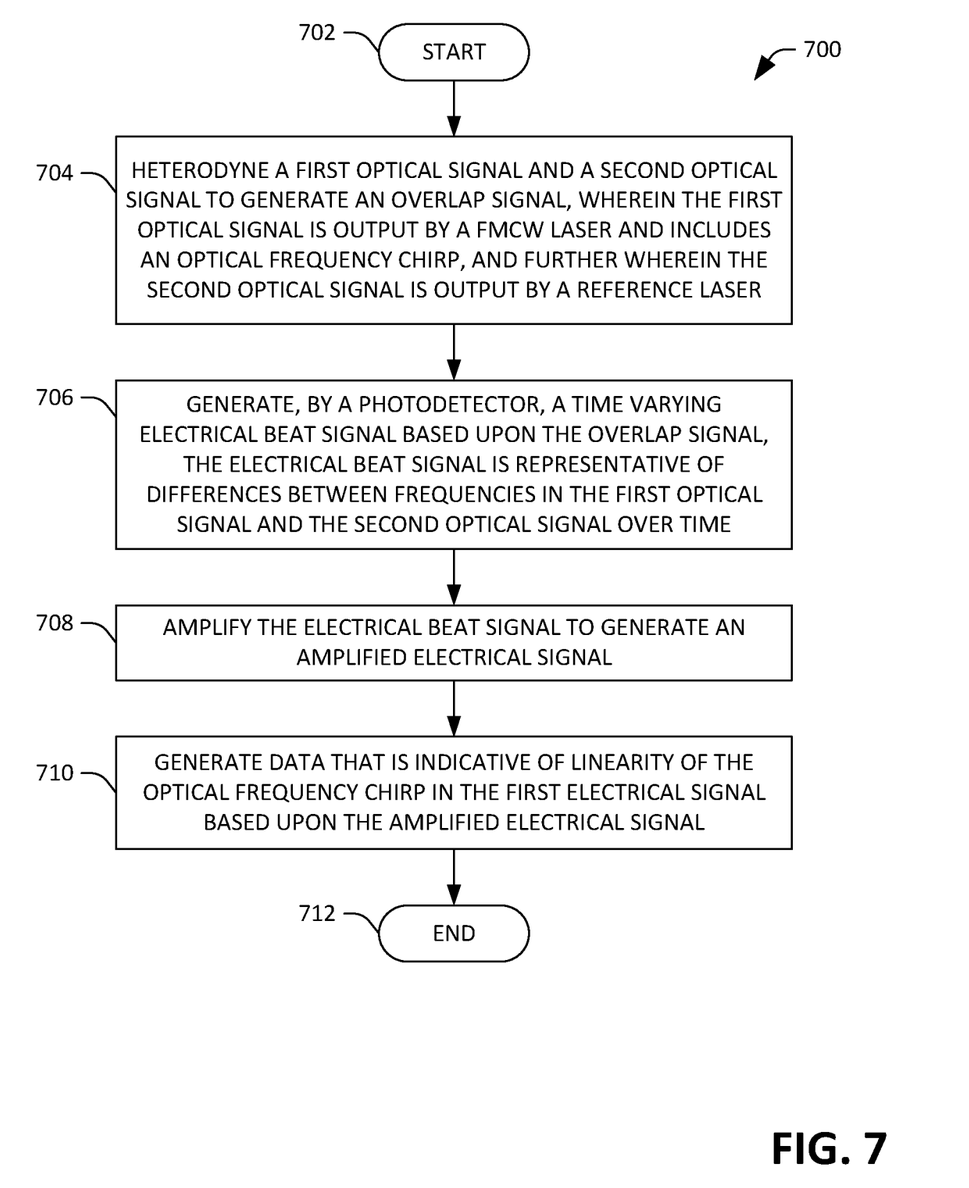
FIG. 7 is a flow diagram illustrating an exemplary methodology for generating data that is indicative of linearity of an optical frequency chirp in an optical signal emitted by an FMCW laser.

Now referring to FIG. 7, a flow diagram illustrating an exemplary methodology 700 for generating data that is indicative of linearity of an optical frequency chirp in a first optical signal emitted by an FMCW laser is illustrated. The methodology 700 starts at 702, and at 704 the first optical signal and a second optical signal are heterodyned to generate overlap signal, wherein the first optical signal is output by a FMCW laser and includes an optical frequency chirp, and further wherein the second optical signal is output by a reference laser. As indicated above, the second optical signal acts as a local oscillator. Further, voltage is applied to a VCO of the FMCW laser in connection with the FMCW laser generating the optical frequency chirp, where application of voltage to the VCO causes frequency to change as a function of time.

At 706, an electrical beat signal is generated by a photodetector based upon the overlap signal. The electrical beat signal generated by the photodetector is representative of the optical frequency chirp included in the first optical signal emitted by the FMCW laser.

At 708, the electrical beat signal is amplified to generate an amplified electrical signal, and at 710 data that is indicative of linearity of the optical frequency chirp in the first electrical signal is generated based upon the amplified electrical signal. As described previously, a high-speed digital oscilloscope can generate frequency values over time (frequency values in the time domain), and such frequency values can be used to compute values for frequency modulation error as described above). In addition, the frequency values can be used to generate values for frequency modulation slope error (as described above). Usability of the FMCW laser in a LIDAR system can then be ascertained based upon the data that is indicative of the linearity of the optical frequency chirp. The methodology 700 completes at 712.

While description set forth herein indicates that the FMCW laser is to be used in a LIDAR system that is to be employed in an AV, other applications are also contemplated. For example, a LIDAR system can be employed to create three-dimensional elevation maps of land. In another example, a LIDAR system can be employed for fiver surveys (e.g., to create three-dimensional models of terrain of river and lake beds). In still yet another example, a LIDAR system can be employed to detect pollutant particles, such as carbon dioxide, sulfur dioxide, and methane, such that pollutant density maps can be constructed. Other applications are also contemplated, wherein the LIDAR system includes an FMCW laser, and further wherein linearity of optical frequency chirps emitted by the FMCW laser have been characterized prior to the FMCW laser being incorporated into the LIDAR system. It is to be understood that the technologies described herein are not limited to the context of AVs.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard. Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
   an optical heterodyne device, the optical heterodyne device configured to generate an overlap optical signal based upon:
   a first optical signal output by a frequency-modulated continuous-wave (FMCW) laser, wherein the first optical signal comprises an optical frequency chirp that is based upon an input voltage signal received by the FMCW laser; and
   a second optical signal output by a reference laser;
   an optical fiber that comprises a first end and a second end, wherein the first end of the optical fiber is coupled to an input port of the heterodyne device;
   a free space-to-fiber coupler that is coupled to the optical fiber, wherein the free space-to-fiber coupler is configured to receive the first optical signal and direct the first optical signal to the second end of the optical fiber;
   a photodetector that is optically coupled to the optical heterodyne device, the photodetector configured to output an electrical beat signal based upon the overlap optical signal, wherein the electrical beat signal is representative of differences between frequencies in the first optical signal and the second optical signal over time; and
   a frequency analyzer system that generates, based upon the electrical beat signal, data that is indicative of linearity of the optical frequency chirp in the first optical signal.

2. The system of claim 1, further comprising:
   a second optical fiber that comprises a first end and a second end, wherein the first end of the second optical fiber is coupled to a second input port of the heterodyne device; and
   a second free space-to-fiber coupler that is coupled to the second optical fiber, wherein the second free space-to-fiber coupler is configured to receive the second optical signal and direct the second optical signal to the second end of the second optical fiber.

3. The system of claim 1, further comprising an amplifier that is configured to receive the electrical beat signal output by the photodetector and amplify the electrical beat signal to generate an amplified electrical signal, wherein the frequency analyzer system generates the data that is indicative of the linearity of the optical frequency chirp in the first optical signal based upon the amplified electrical signal.

4. The system of claim 1, wherein the frequency analyzer system comprises an oscilloscope that is configured to demodulate the amplified electrical signal, wherein the frequency analyzer system generates the data that is indicative of the linearity of the optical frequency chirp in the first optical signal based upon the demodulated amplified electrical signal.

5. The system of claim 4, wherein the data that is indicative of the linearity of the optical chirp in the first optical signal comprises frequency modulation error and frequency modulation slope error.

6. The system of claim 1, further comprising the reference laser.

7. The system of claim 6, wherein frequency of the second optical signal emitted by the reference laser is tunable.

8. The system of claim 1, wherein the reference laser has a linewidth of 10 KHz.

9. The system of claim 1, further comprising a voltage source that is configured to generate the input voltage signal.

10. A method for determining suitability of a frequency-modulated continuous-wave (FMCW) laser in a LIDAR system, the method comprising:
heterodyning a first optical signal and a second optical signal at a heterodyne device to generate an overlap signal, wherein the first optical signal is output by the FMCW laser and directed to the heterodyne device by way of a free space-to-fiber coupler that directs the first optical signal to an optical fiber that is coupled to an input port of the heterodyne device, the first optical includes an optical frequency chirp, the optical frequency chirp is based upon a voltage chirp provided to the FMCW laser, and further wherein the second optical signal is output by a reference laser;
generating, by a photodetector, an electrical beat signal based upon the overlap signal, wherein the electrical beat signal is representative of differences in frequencies in the first optical signal and the second optical signal over time; and
generating data that is indicative of linearity of the optical frequency chirp in the first optical signal based upon the electrical beat signal, wherein the data that is indicative of the linearity of the optical chirp in the first optical signal is indicative of suitability of the FMCW laser in the LIDAR system.

11. The method of claim 10, wherein the electrical beat signal has frequencies in the radio frequency (RF) domain.

12. The method of claim 10, further comprising:
prior to heterodyning the first optical signal and the second optical signal, tuning the reference laser to alter a frequency of the second optical signal.

13. The method of claim 10, further comprising:
amplifying, by an amplifier, the electrical beat signal to generate an amplified electrical signal, wherein the data that is indicative of the linearity of the optical frequency chirp in the first optical signal is generated based upon the amplified electrical signal.

14. The method of claim 10, wherein the data that is indicative of the linearity of the optical frequency chirp in the first optical signal comprises frequency modulation error and frequency modulation slope error.

15. The method of claim 10, further comprising incorporating the FMCW laser into the LIDAR system based upon the data that is indicative of the linearity of the optical frequency chirp in the first optical signal.

16. The method of claim 15, further comprising incorporating the LIDAR system into an autonomous vehicle (AV), wherein the AV autonomously navigates roadways based upon output of the LIDAR system.

17. The method of claim 10, further comprising providing the electrical beat signal to a frequency analyzer system, wherein the data that is indicative of the linearity of the optical frequency chirp in the first optical signal is based upon output of the frequency analyzer system.

18. A system comprising:
heterodyning means for heterodyning a first optical signal and a second optical signal to generate an overlap signal, wherein the first optical signal is output by a frequency-modulated continuous wave (FMCW) laser and directed to the heterodyning means by way of a free space-to-fiber coupler that directs the first optical signal to an optical fiber that is coupled to an input port of the heterodyning means, the first optical signal includes an optical frequency chirp, the optical frequency chirp is based upon a voltage chirp provided to the FMCW laser, and further wherein the second optical signal is output by a reference laser;
mixing means for generating an electrical beat signal based upon the overlap signal, wherein the electrical signal is representative of differences between frequencies in the first optical signal and the second optical signal over time; and
analyzer means for outputting data that is indicative of linearity of the optical frequency chirp in the first optical signal, the analyzer means outputs the data based upon the electrical beat signal.

19. The system of claim 18, wherein the data that is indicative of the linearity of the optical frequency chirp in the first optical signal comprises frequency modulation error and frequency modulation slope error.

20. The system of claim 18, wherein the analyzer means comprises an oscilloscope.

* * * * *